US 9,507,170 B2

United States Patent
Imada

(10) Patent No.: US 9,507,170 B2
(45) Date of Patent: Nov. 29, 2016

(54) OPTICAL APPARATUS, INTERCHANGEABLE LENS, AND METHOD FOR CORRECTING IMAGE BLURRING

(71) Applicant: CANON KABUSHIKI KAISHA, Tokyo (JP)

(72) Inventor: Shinji Imada, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 154 days.

(21) Appl. No.: 14/302,294

(22) Filed: Jun. 11, 2014

(65) Prior Publication Data

US 2014/0368912 A1    Dec. 18, 2014

(30) Foreign Application Priority Data

Jun. 14, 2013    (JP) .................................. 2013-125726

(51) Int. Cl.
*H04N 5/232* (2006.01)
*G02B 27/64* (2006.01)
*G06T 7/20* (2006.01)
*G06T 5/00* (2006.01)

(52) U.S. Cl.
CPC ............ *G02B 27/646* (2013.01); *G06T 5/003* (2013.01); *G06T 7/2013* (2013.01); *H04N 5/23209* (2013.01); *H04N 5/23245* (2013.01); *H04N 5/23254* (2013.01); *H04N 5/23258* (2013.01); *H04N 5/23287* (2013.01); *G06T 2207/20201* (2013.01)

(58) Field of Classification Search
CPC .................................................. H04N 5/23209
USPC ............................................................ 396/55
See application file for complete search history.

(56) References Cited

U.S. PATENT DOCUMENTS

| | | | | |
|---|---|---|---|---|
| 2009/0263116 | A1* | 10/2009 | Saito | .................... G02B 27/646 |
| | | | | 396/55 |
| 2010/0158493 | A1* | 6/2010 | Miyasako | .......... H04N 5/23212 |
| | | | | 396/55 |
| 2014/0267809 | A1* | 9/2014 | Tsubaki | ............. H04N 5/23267 |
| | | | | 348/208.6 |
| 2014/0354834 | A1* | 12/2014 | Narita | ................ H04N 5/23287 |
| | | | | 348/208.4 |

FOREIGN PATENT DOCUMENTS

JP        7-104338 A        4/1995

* cited by examiner

*Primary Examiner* — David Gray
*Assistant Examiner* — Dennis Hancock
(74) *Attorney, Agent, or Firm* — Canon USA, Inc., IP Division

(57) ABSTRACT

An optical apparatus includes a blurring detection unit configured to detect image blurring applied to the optical apparatus; and a motion vector calculation unit configured to calculate a motion vector among a plurality of images shot by the optical apparatus. Image blurring is corrected in accordance with a signal obtained from blurring detected by the blurring detection unit; the motion vector is calculated using a correction result of the image blurring; and the image blurring is further corrected using the calculated motion vector.

10 Claims, 6 Drawing Sheets

OPTICAL APPARATUS, INTERCHANGEABLE LENS, AND METHOD FOR CORRECTING IMAGE BLURRING

BACKGROUND OF THE INVENTION

1. Field of the Invention

The present invention relates to an optical apparatus, an interchangeable lens, and a method for correcting image blurring capable of favorably correcting image blurring.

2. Description of the Related Art

An image pick-up apparatus, such as a digital camera, has a function to correct blurring (image blurring) of a shot image generated by vibration (blurring) applied to the image pick-up apparatus. As an exemplary method for correcting image blurring, optical image blur correction has been proposed.

In the optical image blur correction, vibration applied to the image pick-up apparatus is detected and, in accordance with the detected vibration, the position of an image to be formed on the image pickup element is moved with respect to an image pickup optical system. In this manner, image blurring in the image formed on the image pickup element may be corrected.

Exemplary methods for detecting blurring include a method for detecting blurring of an image pickup device using, for example, an angular velocity sensor and an acceleration sensor, and a method for calculating a motion of an image from a shot image and calculating a signal, as blurring of the image pick-up apparatus, from which signal a motion of a subject is subtracted.

An image blurring correction device described in Japanese Patent Laid-Open No. 7-104338 may enlarge a range in which blurring correction is possible by controlling an optical image blur correction process in each optical apparatus in an appropriate ratio when optical apparatuses having functions to perform optical image blur correction are combined.

In the image blurring correction device described in Japanese Patent Laid-Open No. 7-104338, however, since a plurality of optical apparatuses having optical image blur correction mechanisms are combined and the plurality of optical image blur correction mechanisms are controlled simultaneously, the control to correct image blurring becomes complicated. Therefore, in the conventional art, problems of overcorrection and insufficient correction of image blurring may occur.

SUMMARY OF THE INVENTION

An optical apparatus according to the present invention includes: a first image blurring correction unit configured to correct image blurring by moving a first image blurring correction lens; a second image blurring correction unit configured to correct image blurring by moving a second image blurring correction lens; a blurring detection unit configured to detect blurring applied to the optical apparatus; and a motion vector calculation unit configured to calculate a motion vector among a plurality of images shot by the optical apparatus, wherein the first image blurring correction unit is capable of correcting image blurring in accordance with a blurring signal detected by the blurring detection unit; and wherein the second image blurring correction unit is capable of correcting image blurring in accordance with a motion vector signal calculated by the motion vector calculation unit.

An interchangeable lens of the present invention is detachable from a camera and is communicable with the camera. The interchangeable lens includes: a first image blurring correction unit configured to correct image blurring by moving the first image blurring correction lens; a second image blurring correction unit configured to correct image blurring by moving the second image blurring correction lens; and a blurring detection unit configured to detect blurring applied to the interchangeable lens. The camera calculates a motion vector between a plurality of shot images and transmits information about the motion vector to the interchangeable lens. Then the first image blurring correction unit is capable of correcting image blurring in accordance with a blurring signal detected by the blurring detection unit, and the second image blurring correction unit is capable of correcting image blurring in accordance with information about the motion vector received from the camera.

A method for correcting image blurring according to the present invention includes: detecting blurring applied to an optical apparatus; correcting image blurring in a plurality of images shot by the optical apparatus in accordance with the detected blurring; calculating a motion vector between a plurality of images of which the image blurring has been corrected; and correcting image blurring in accordance with the calculated motion vector.

Further features of the present invention will become apparent from the following description of exemplary embodiments with reference to the attached drawings.

DESCRIPTION OF THE EMBODIMENTS

Hereinafter, embodiments of the present invention will be described with reference to the drawings.

First Embodiment

Figure 1:
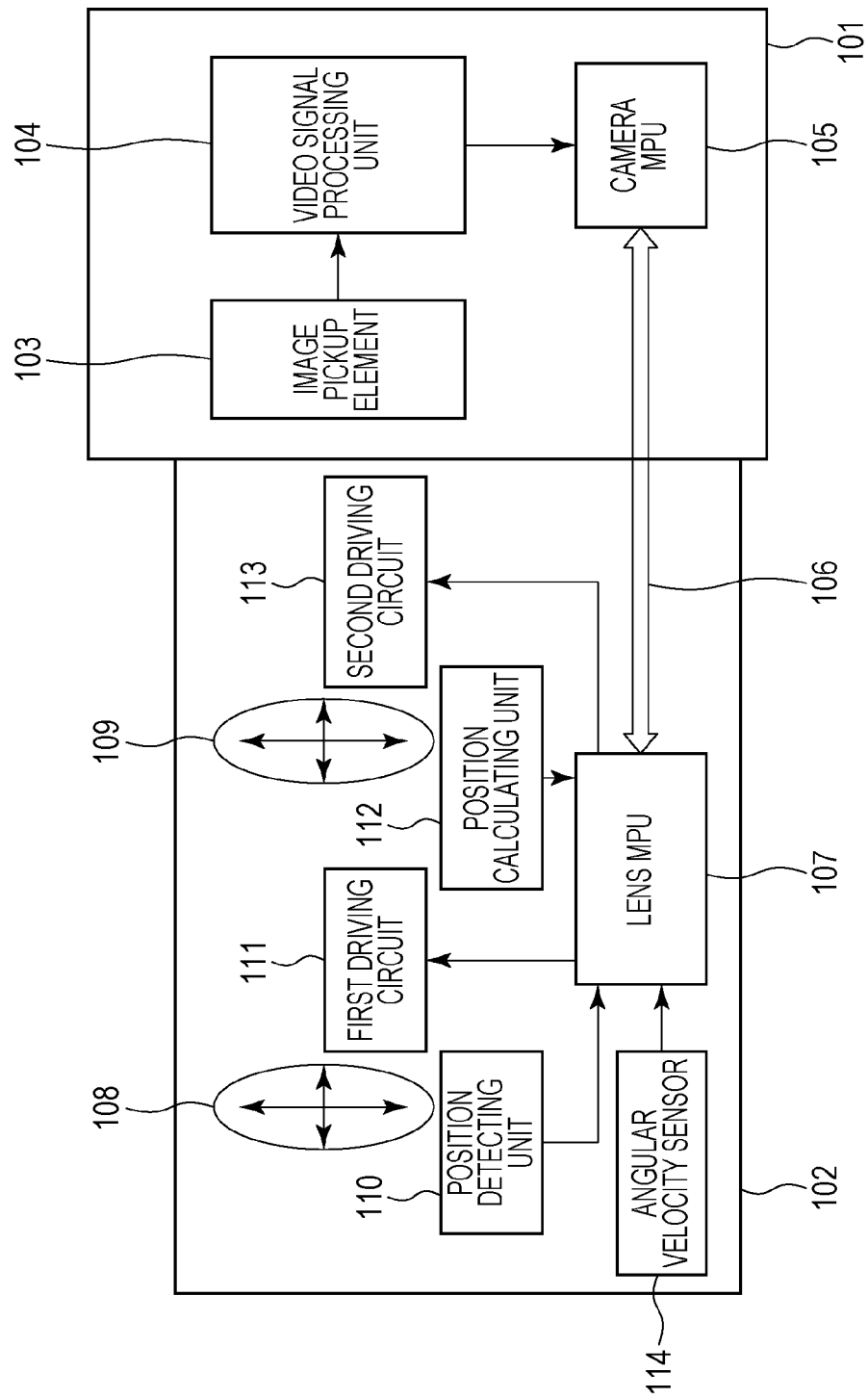
FIG. 1 is a block diagram of a camera system according to a first embodiment.

FIG. 1 is a block diagram illustrating a configuration of a camera system according to a first embodiment. The camera system according to the first embodiment consists of a camera body 101 and an interchangeable lens 102. An image pickup light flux from a subject passes through an image pickup optical system of the interchangeable lens 102 and forms an image on a light-receiving surface of an image pickup element 103. The formed image of the subject is photoelectrically converted by the image pickup element 103 and is output as an electrical signal. A video signal processing unit 104 performs, for example, signal amplification, A/D conversion, image processing, such as filtering, to the output electrical signal. The video signal processing unit 104 discriminates a main object and calculates a motion vector quantity. The calculated motion vector quantity is transmitted as a motion vector signal to a camera MPU 105 which manages control of a camera body 101.

The camera MPU 105 communicates with a lens MPU 107 of the interchangeable lens 102 via a communication line 106. In the communication between the camera and the interchangeable lens 102, a focus driving instruction is transmitted from the camera body 101 to the interchangeable lens 102, and data communication about operational states of the camera body 101 and the interchangeable lens 102 and optical information, such as diaphragm control information, is performed. In this communication, the motion vector signal calculated in the video signal processing unit 104 is transmitted from the camera MPU 105 to the lens MPU 107.

The interchangeable lens 102 includes a first image blurring correction lens 108 and a second image blurring correction lens 109. The first image blurring correction lens 108 is a lens for correcting blurring applied to the camera system which is detected by a blurring detect sensor. The second image blurring correction lens 109 is a lens for correcting image blurring in accordance with the motion vector. Here, "image blurring correction" should include not only removal of all the image blurring but reduction of the image blurring.

The interchangeable lens 102 includes a position detecting unit 110 which detects a moving amount of the first image blurring correction lens 108, and a first driving circuit 111 for driving the first image blurring correction lens 108. Hereinafter, a configuration including the first image blurring correction lens 108, the position detecting unit 110 and the first driving circuit 111 will be referred to as a first image blurring correction unit.

The interchangeable lens 102 further includes an angular velocity sensor 114 which detects blurring applied to the camera system. Here, an acceleration sensor may be used as a unit which detects blurring applied to the camera system.

The interchangeable lens 102 further includes a position calculating unit 112 for calculating a moving amount of the second image blurring correction lens 109, and a second driving circuit 113 for driving the second image blurring correction lens 109. Hereinafter, a configuration including the second image blurring correction lens 109, the position calculating unit 112, and the second driving circuit 113 will be referred to as a second image blurring correction unit.

Subsequently, a method for correcting image blurring will be described. First, a blurring signal indicating blurring detected by the angular velocity sensor 114 is input in the lens MPU 107. The lens MPU 107 calculates a driving target position of the first image blurring correction lens 108 and, in accordance with a difference between the position of the first image blurring correction lens 108 detected by the position detecting unit 110 and the driving target position, generates a driving signal for instructing driving of the first image blurring correction lens 108. The generated driving signal is output to the first driving circuit 111 and the first image blurring correction lens 108 is driven by the first driving circuit 111.

Although image blurring correction is performed by driving of the first image blurring correction lens 108, image blurring remains due to an error in blurring detection in the angular velocity sensor 114 and an error in location detection in the position detecting unit 110 and other reasons. Here, image blurring of low-frequency component which is not detected by the angular velocity sensor 114 is also not corrected and remains as image blurring. An image of a subject in which such image blurring remains is picked up by the image pickup element 103 and the image pickup signal is processed by the video signal processing unit 104. The remaining image blurring is calculated as a motion vector quantity indicating a video motion between a plurality of shot images. The video signal processing unit 104 functions as a motion vector calculation unit which calculates the motion vector quantity.

Here, the motion vector quantity may be calculated by, for example, using the correlational method and the block matching method. In the block matching method, a field (or a frame (the same shall apply hereafter)) of the input video signal is divided into a plurality of blocks of suitable size (for example, 8×8 lines) and a block in a previous field of which correlation value with a specific block in the current field becomes the minimum is retrieved. Here, the correlation value is represented by, for example, the sum of absolute values of differences in pixel values (brightness values) between a specific block and a retrieved block in the previous field. Then, a relative amount and direction of misalignment between a block in a previous field of which correlation value with a specific block in the current field and a specific block in the current field becomes the minimum is expressed as a motion vector of the specific block. As used herein the term "vector" is given its ordinary meaning of a quantity having direction and magnitude, or more specifically, a quantity indicating the position of one point in space relative to another. Therefore, the calculated "motion vector" indicates the moving amount (magnitude of movement) in each of the vertical direction and the horizontal direction in the pixel unit. This motion vector also indicates a moving amount (magnitude of movement) per unit time of an object in a continuous picked-up image (a field image or a frame image), and therefore a value proportional to the moving amount of the continuous picked-up image is obtained.

The calculated motion vector quantity is transmitted from the camera MPU 105 to the lens MPU 107. The lens MPU 107 calculates the driving target position of the second image blurring correction lens 109 based on the motion vector quantity. Further, in accordance with differences between the position of the second image blurring correction lens 109 calculated by the position calculating unit 112 and the driving target position, the lens MPU 107 generates a driving signal for instructing driving of the second image blurring correction lens 109. The generated driving signal is output to the second driving circuit 113, and the second image blurring correction lens 109 is driven by the second driving circuit 113.

In the foregoing, the function of each part which constitutes the camera system according to the present embodiment has been described.

Next, an operation of correcting image blurring performed on the interchangeable lens 102 side will be described with reference to the flowchart of FIG. 2. Image blurring correction is a process performed in the lens MPU 107 and shall be performed by timer interruption occurring in each fixed period. The operation in each of the following steps is performed by the lens MPU 107.

First, in S201, an angular velocity signal output from the angular velocity sensor 114 is converted to a digital signal by a non-illustrated A/D (analog-to-digital) converter circuit. In S202, high pass filtering (HPF) operation is performed to the A/D converted angular velocity signal and an offset component is removed. In S203, an integration operation is performed to the result of the high pass filter operation, and the angular velocity signal is converted into an angular displacement signal. In S204, a first lens driving target signal (SFTDRV1) for driving the first image blurring correction lens 108 is calculated based on the angular displacement signal. In S205, the output signal of the position detecting unit 110 which represents the position of the first image blurring correction lens 108 is A/D converted. The result of the A/D conversion is expressed as SFTPST1. In S206, feedback operation (SFTDRV1-SFTPST1) is performed about the target signal (SFTDRV1) and an output result (SFTPST1) of the position detecting unit 110. The operation result is expressed as SFT_DT1. In S207, filtering and the like are performed to the feedback operation result (SFT_DT1) and a signal for driving the lens 108 is generated. In S208, the signal for driving the lens 108 is output to the driving circuit 111 and the first image blurring correction lens 108 is driven. As described above, in accordance with the detected blurring signal, the first image blurring correction lens 108 is driven and image blurring correction is performed.

Subsequently, the correction operation of image blurring using the motion vector will be described. First, in S209, information about the motion vector received from the camera MPU 105 is read. In S210, a second lens driving target signal (SFTDRV2) for driving the second image blurring correction lens 109 is calculated based on the motion vector. In S211, an output signal of the position calculating unit 112 which represents the position of the second image blurring correction lens 109 is A/D converted. The result of the A/D conversion is expressed as SFTPST2. In S212, feedback operation (SFTDRV2-SFTPST2) is performed about the target signal (SFTDRV2) and the output result (SFTPST2) of the position calculating unit 112. The operation result is expressed as SFT_DT2. In S213, filtering and the like are performed to the feedback operation result (SFT_DT2) and a signal driving the lens is generated. In S214, the signal for driving the lens 109 is output to the driving circuit 113 and the second image blurring correction lens 109 is driven. As described above, the second image blurring correction lens 109 is driven in accordance with the motion vector calculated by the camera, and image blurring correction is performed.

As described above, in a case in which the interchangeable lens 102 includes the first image blurring correction lens 108 and the second image blurring correction lens 109, the first image blurring correction lens 108 is driven first depending on the output of the angular velocity sensor 114 provided in the interchangeable lens 102. Then, in the camera body 101, remaining image blurring is calculated as the motion vector and information about the motion vector is transmitted to the interchangeable lens 102. The interchangeable lens 102 drives the second image blurring correction lens 109 depending on the received motion vector. In this manner, image blurring is corrected favorably in the present embodiment.

In the present embodiment, since a plurality of image blurring correction units may be controlled independently to correct image blurring, it is possible to simplify control of the image blurring correction. By simplifying the control system about the image blurring correction, electric power consumption may be reduced and the cost to configure the control system may be reduced.

In a case in which the first image blurring correction unit is not capable of sufficiently correcting image blurring, further image blurring correction may be performed using the second image blurring correction unit. Therefore, large image blurring may be corrected favorably. Moreover, as further discussed below, image blurring correction may be iteratively implemented by repeating the blur correction of one or more of the image blurring correction units, until an appropriate level of blurring correction is favorably achieved.

Second Embodiment

Next, a second embodiment will be described with reference to the flowchart of FIG. 3. In the present embodiment, the method for correcting image blurring is changed depending on the image shooting mode of the camera.

The configuration of the camera system is the same as that of the first embodiment. In the present embodiment, control about the image blurring correction is changed depending on the image shooting mode. The camera body 101 includes an unillustrated image shooting mode setting unit which sets the image shooting mode. The image shooting mode setting unit may switch between a movie shooting mode in which movie shooting is performed and a still image shooting mode in which still image shooting is performed. Here, the image shooting mode setting unit may be a user-operable member, such as a switch, or may be built in the camera body 101 and sets the image shooting mode in response to, for example, an audio instruction.

When the image shooting mode is set to the movie shooting mode by the image shooting mode setting unit, an influence of image blurring increases. Therefore, image blurring is corrected using both the first image blurring correction unit and the second image blurring correction unit. On the other hand, when the image shooting mode is set to the still image shooting mode, only the first image blurring correction unit corrects image blurring. If image blurring is corrected using both the first image blurring correction unit and the second image blurring correction unit, optical aberration increases. Therefore, since priority is given to quality of the image to be shot when still image shooting is performed, only the first image blurring correction unit corrects image blurring.

Figure 2:
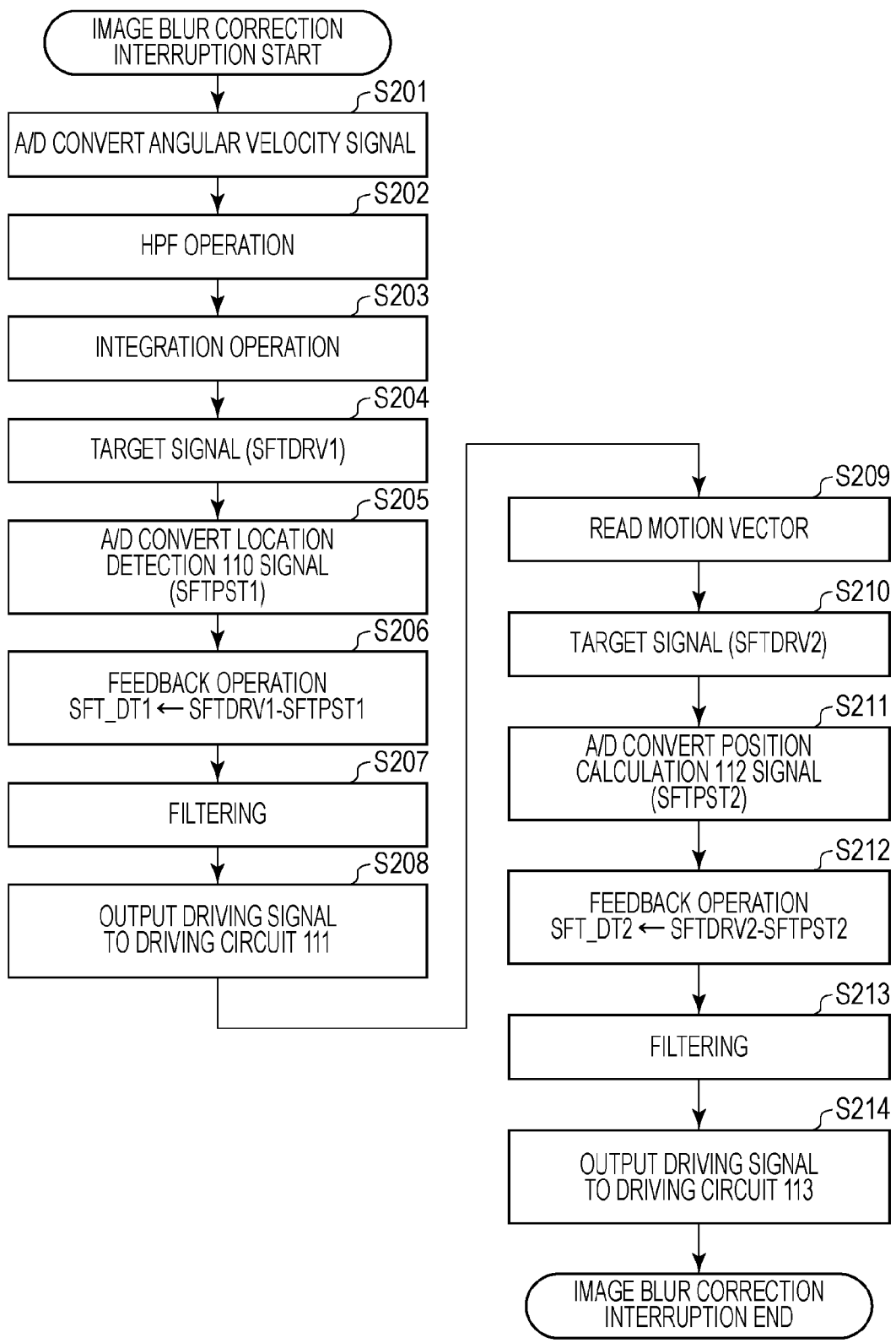
FIG. 2 is a flowchart illustrating an operation of image blurring correction according to the first embodiment.
Figure 3:
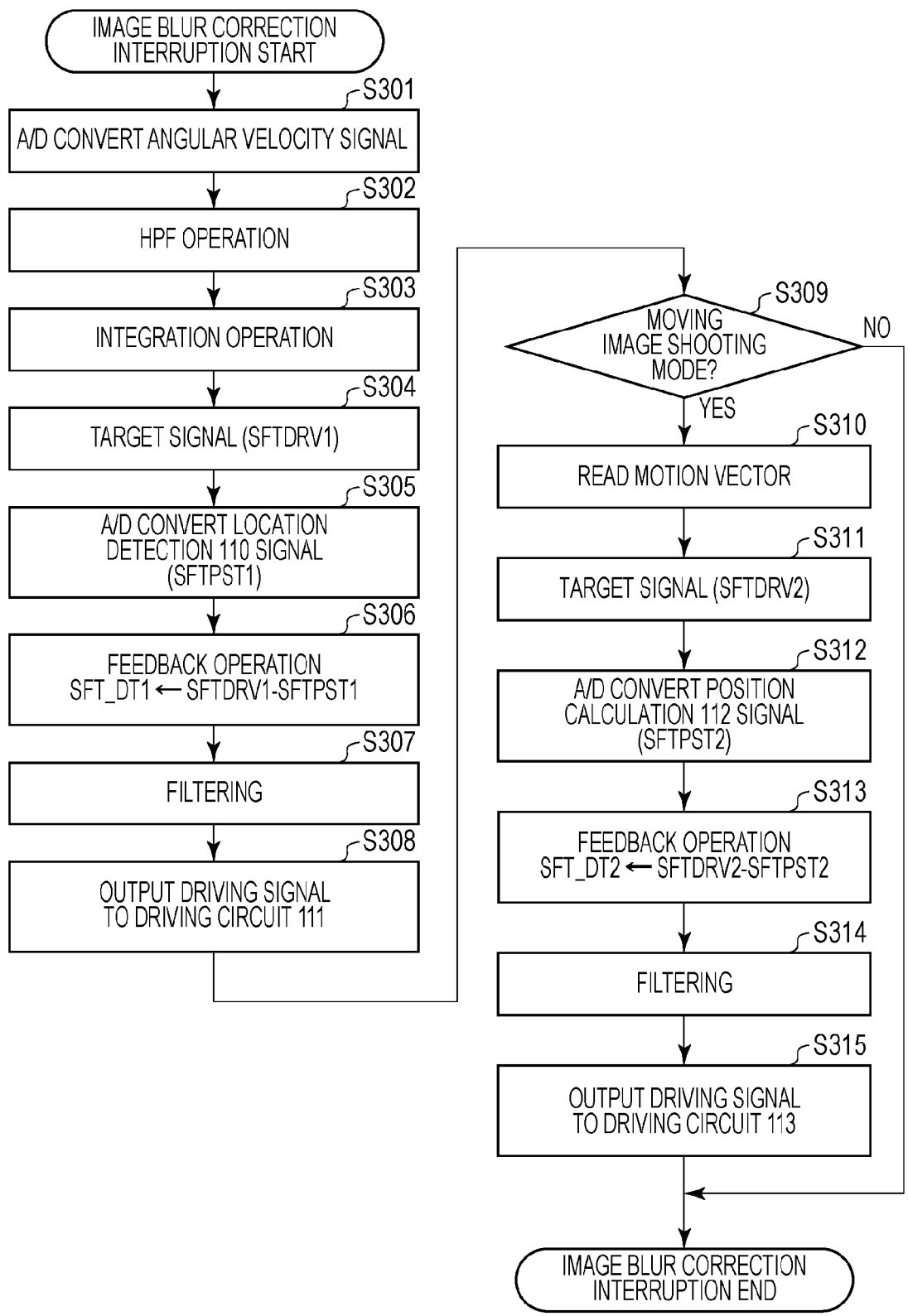
FIG. 3 is a flowchart illustrating an operation of image blurring correction according to a second embodiment.

The operation by the lens MPU 107 illustrated from S301 to S308 of FIG. 3 is the same as the operation from S201 to S208 of FIG. 2. In S309, the lens MPU 107 determines whether the image shooting mode of the camera is the movie shooting mode or the still image shooting mode. The lens MPU 107 may recognize the current image shooting mode of the camera by receiving information about the set image shooting mode from the camera MPU 105.

If the image shooting mode is set to the movie shooting mode, the process proceeds to S310 and thereafter. The operation by the lens MPU 107 from S310 to S315 is the same as the operation from S209 to S214 of FIG. 2. If it is determined in S309 that the image shooting mode has been set to the still image shooting mode, image blurring correction by the second image blurring correction unit is not performed and control of image blurring correction is completed.

In this manner, when the still image shooting mode is set, image blurring correction is performed only by the first image blurring correction unit, thereby preventing occurrence of large optical aberration. On the other hand, when the movie shooting mode is set, image blurring correction is performed using both the first image blurring correction unit and the second image blurring correction unit, thereby enabling favorable correction of large image blurring.

Third Embodiment

Figure 4:
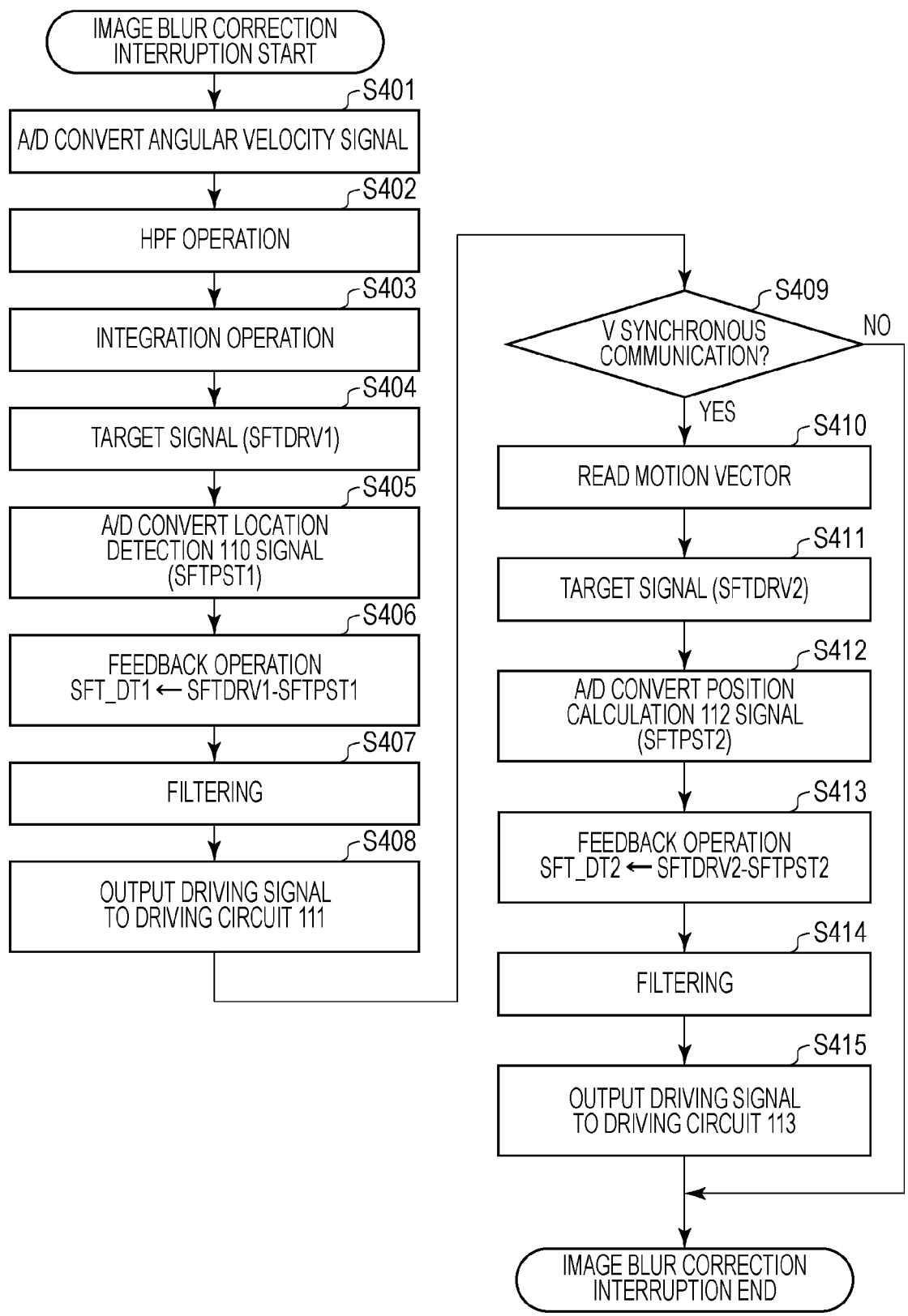
FIG. 4 is a flowchart illustrating an operation of image blurring correction according to a third embodiment.

Next, a third embodiment will be described with reference to the flowchart of FIG. 4. In the present embodiment, control of image blurring correction is changed depending on the communication form between the camera and the lens. The camera includes a communication form setting unit for setting the communication form. The communication form setting unit sets the communication between the camera and the lens to synchronous communication or asynchronous communication.

The flowchart about image blurring correction in the present embodiment is the same as the flowchart of the second embodiment except for S409. In the present embodiment, the lens MPU 107 determines the communication form between the camera and the lens in S409 and, changes the blurring correction control depending on whether the communication is performed in synchronous communication or in asynchronous communication.

Fourth Embodiment

Figure 5:
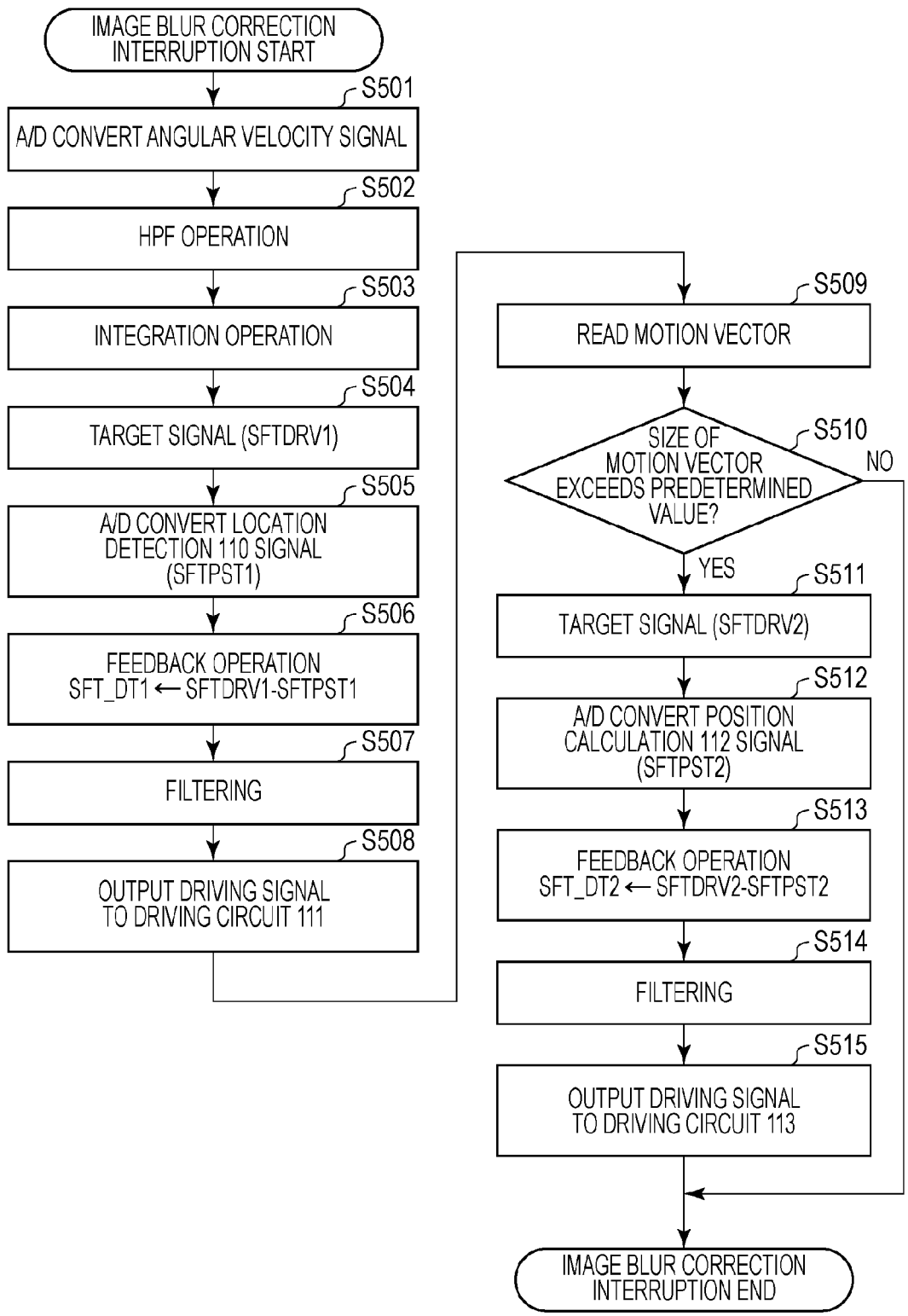
FIG. 5 is a flowchart illustrating an operation of image blurring correction according to a fourth embodiment.

Next, a fourth embodiment will be described with reference to the flowchart of FIG. 5. In the present embodiment, control of image blurring correction is changed depending on the size of the calculated motion vector. Regarding the flowchart about the image blurring correction in the present embodiment, the operation from S501 to S509 by the lens MPU 107 is the same as the operation from S201 to S209 of the first embodiment.

In the present embodiment, it is determined in S510 whether the size of the motion vector is equal to or greater than a predetermined value. When the size of the motion vector is equal to or greater than a predetermined value, the process proceeds to S511 and thereafter, in which image blurring correction using the motion vector is performed as described in the first embodiment. On the other hand, when the motion vector is smaller than a predetermined value, the process of image blurring correction is completed.

In the present embodiment, whether image blurring correction using the motion vector is to be performed is determined depending on the size of the motion vector corresponding to the amount of remaining image blurring. If the amount of remaining image blurring is small, it is determined that there is no need to perform further image blurring correction and the process of image blurring correction is completed, whereby unnecessary image blurring correction process is not performed.

Fifth Embodiment

Figure 6:
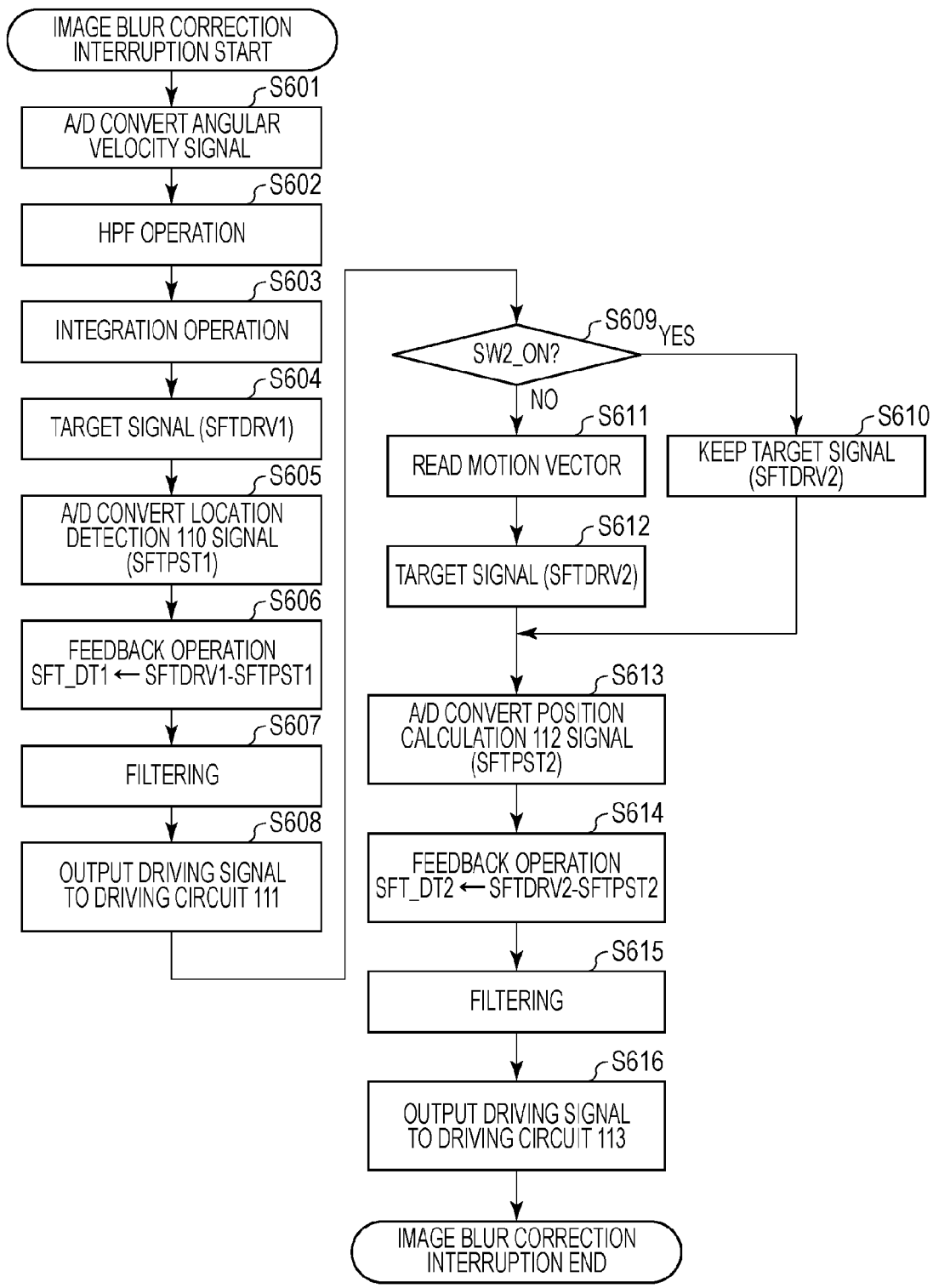
FIG. 6 is a flowchart illustrating an operation of image blurring correction according to a fifth embodiment.

Next, a fifth embodiment will be described with reference to the flowchart of FIG. 6. In the present embodiment, control about image blurring correction is changed at the timing at which the camera starts an image shooting operation. Regarding the flowchart of control of the image blurring correction in the present embodiment, control from S601 to S608 by the lens MPU 107 is the same as the control from S201 to S208 of the first embodiment.

In the present embodiment, control about subsequent image blurring correction is changed depending on whether an unillustrated release switch provided in the camera body 101 is fully pressed.

The release switch has a two-stage switch structure: a first-stage press is referred to as a half pressed state and a second-stage press is referred to as a fully pressed state. When the release switch becomes the half pressed state, autofocus control and control about adjustment of exposure are started. When the release switch becomes the fully pressed state, an image shooting process and a recording operation of the shot image are started. That is, the release switch has a function to instruct a shift to the image shooting operation. In the flowchart of FIG. 6, that the release switch is in the fully pressed state is expressed as SW2 being ON.

In S609, if it is determined that the release switch is in the fully pressed state, the second lens driving target signal (SFTDRV2) calculated immediately therebefore is not updated and the process proceeds to S613 and thereafter. Here, control in S613 and thereafter is the same as the control in S211 and thereafter in the first embodiment.

On the other hand, if it is determined in S609 that the release switch is not in the fully pressed state, the process proceeds to control of S611 and thereafter. Here, control of S611 and thereafter is the same as the control of S209 and thereafter of the first embodiment.

By the control of image blurring correction of the present embodiment, if the subject is a moving body, for example, moving body tracking by the second image blurring correction unit may be performed during preparation of image shooting (before the release switch becomes the fully pressed state) in accordance with the motion vector signal. After the release switch becomes the fully pressed state, the second image blurring correction lens 109 is kept at a position defined in accordance with the motion vector signal calculated before the release switch becomes the fully pressed state. By performing such control, image blurring correction by the first image blurring correction unit may be performed while performing moving body tracking during preparation of the image shooting.

Modification

Preferred embodiments of the present invention have been described above, but the present invention is not limited to the same. Various modifications and changes may be made without departing from the scope of the present invention.

In each of the foregoing embodiments, the camera system consisting of the camera detachable from interchangeable lens and the interchangeable lens has been described as the optical apparatus. The present invention is applicable also to a camera with an integrated lens.

The present invention may be implemented also by performing the following process. That is, software (a program) which implements the functions of the embodiments described above are provided in the system or the device via a network or various storage media, and a computer (or CPU, MPU and the like) of the system or the device reads and executes the program.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-125726, filed Jun. 14, 2013, which is hereby incorporated by reference herein in its entirety.

What is claimed is:

1. An optical apparatus comprising:
a first image blurring correction unit configured to correct image blurring by moving a first image blurring correction lens;
a second image blurring correction unit configured to correct image blurring by moving a second image blurring correction lens;
a blurring detection unit configured to detect blurring applied to the optical apparatus; and
a motion vector calculation unit configured to calculate a motion vector between a plurality of images shot by the optical apparatus, wherein the first image blurring correction unit is capable of correcting image blurring in accordance with a blurring signal detected by the blurring detection unit; and the second image blurring correction unit is capable of correcting image blurring in accordance with a motion vector signal the motion vector signal calculated using a plurality of images of which image blurring has been corrected by the first image blurring correction unit.

2. The optical apparatus according to claim 1, further comprising an image shooting mode setting unit configured to set an image shooting mode, wherein, when the image shooting mode is set to a movie shooting mode by the image shooting mode setting unit, image blurring correction is performed by the first image blurring correction unit and the second image blurring correction unit and, wherein, when the image shooting mode is set to a still image shooting mode by the image shooting mode setting unit, image blurring correction is performed only by the first image blurring correction unit.

3. The optical apparatus according to claim 1, further comprising a release switch configured to instruct an image shooting operation, wherein, before an image shooting operation is instructed by the release switch, image blurring correction is performed by the first image blurring correction unit and the second image blurring correction unit and, in a case an image shooting operation is instructed by the release switch, the second image blurring correction unit maintains the second image blurring correction lens at a position defined in accordance with a motion vector signal calculated before the instruction of the image shooting operation is issued and image blurring correction is performed by the first image blurring correction unit.

4. The optical apparatus according to claim 1, wherein, in a case the size of the motion vector calculated by the motion vector calculation unit is equal to or greater than a predetermined value, image blurring correction by the second image blurring correction unit is performed and, in a case the size of the motion vector calculated by the motion vector calculation unit is smaller than a predetermined value, image blurring correction by the second image blurring correction unit is not performed.

5. The optical apparatus according to claim 1, further comprising a communication form setting unit configured to set a communication form in the optical apparatus, wherein, in a case the communication form is set to a synchronous communication by the communication form setting unit, image blurring correction is performed by the first image blurring correction unit and the second image blurring correction unit and, in a case the communication form is set to an asynchronous communication by the communication form setting unit, image blurring correction is performed only by the first image blurring correction unit.

6. The optical apparatus according to claim 1, wherein the blurring detection unit detects an angular velocity of the optical apparatus.

7. The optical apparatus according to claim 1, wherein the blurring detection unit detects an acceleration of the optical apparatus.

8. The optical apparatus according to claim 1, wherein the optical apparatus is a camera system which includes a camera and an interchangeable lens detachable from the camera.

9. An interchangeable lens detachable from a camera and configured to communicate with the camera, comprising:

a first image blurring correction unit configured to correct image blurring by moving a first image blurring correction lens;

a second image blurring correction unit configured to correct image blurring by moving a second image blurring correction lens; and a blurring detection unit configured to detect blurring applied to the interchangeable lens, wherein the camera is capable of calculating a motion vector between a plurality of shot images, the motion vector calculated using a plurality of images of which image blurring has been corrected by the first image blurring correction unit, and transmitting information about the motion vector to the interchangeable lens;

the first image blurring correction unit is capable of correcting image blurring in accordance with a blurring signal detected by the blurring detection unit; and the second image blurring correction unit is capable of correcting image blurring in accordance with the information about the motion vector received from the camera.

10. A method for correcting image blurring, comprising:

detecting blurring applied to an optical apparatus;

correcting image blurring in a plurality of images shot by the optical apparatus in accordance with the detected blurring;

calculating a motion vector between a plurality of images of which the image blurring has been corrected; and correcting image blurring in accordance with the calculated motion vector.

* * * * *